(12) United States Patent
Deutsch

(10) Patent No.: US 6,795,627 B1
(45) Date of Patent: Sep. 21, 2004

(54) LIGHT WAVEGUIDE AND AN OPTICAL FIBER ISOLATOR

(75) Inventor: Bernhard A. M. Deutsch, Hickory, NC (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/049,898

(22) PCT Filed: Oct. 2, 2000

(86) PCT No.: PCT/DE00/03461
§ 371 (c)(1),
(2), (4) Date: Feb. 12, 2002

(87) PCT Pub. No.: WO01/23949
PCT Pub. Date: Apr. 5, 2001

(30) Foreign Application Priority Data

Sep. 30, 1999 (DE) .......................... 199 47 033

(51) Int. Cl.⁷ ............................................... G02B 6/16
(52) U.S. Cl. ........................................ 385/123; 385/11
(58) Field of Search .................. 385/11, 123, 126–128, 385/141–144

(56) References Cited

U.S. PATENT DOCUMENTS

| | | | |
|---|---|---|---|
| 3,768,146 A | * 10/1973 | Braun et al. | .................. 29/460 |
| 4,371,838 A | 2/1983 | Griscom | |
| 4,726,652 A | 2/1988 | Tajima et al. | |
| 5,408,565 A | 4/1995 | Levy et al. | |
| 5,479,542 A | 12/1995 | Krivoshlykov | |
| 5,479,551 A | 12/1995 | DiGiovanni et al. | |
| 5,500,915 A | 3/1996 | Iwatsuka et al. | |
| 5,781,677 A | 7/1998 | Jin et al. | |
| 6,072,930 A | * 6/2000 | Kornreich et al. | .......... 385/123 |

FOREIGN PATENT DOCUMENTS

| | | |
|---|---|---|
| EP | 0 227 366 | 7/1987 |
| JP | 06027356 | 2/1994 |
| JP | 07064023 | 3/1995 |
| JP | 09292528 | 11/1997 |

OTHER PUBLICATIONS

K. Shiraishi et al., "Fiber–Embedded In–Line Isolator", Journal of Lightwave Technology, vol. 9, No. 4, Apr. 1991, pp. 430–435.

W. Wang et al., "Analysis of Magneto–Optic Nonreciprocal Phase Shift in Asymmetric Fibers for All–Fiber Isolators by Variational Vector–Wave Mode–Matching Method", Journal of Lightwave Technology, vol. 14, No. 5, May 1996, pp. 749–759.

M. Levy et al., "Integrated Optical Isolators with Sputter–Deposited Thin–Film Magnets", IEEE Photonics Technology Letters, vol. 8, No. 7, Jul. 1996, pp. 903–905.

* cited by examiner

Primary Examiner—Akm Enayet Ullah
Assistant Examiner—Michelle R. Connelly-Cushwa
(74) Attorney, Agent, or Firm—Walter M. Douglas

(57) ABSTRACT

The invention describes an optical waveguide and a fiberoptic isolator wherein the optical waveguide rotating the plane of polarization of coupled light consists of a fiber core (11) exhibiting the Faraday effect, a fiber cladding (3) and a coating (5) concentrically surrounding the YIG-doped fiber core (11) and generating a permanent magnetic field. The outer coating (5) is manufactured from a material that is magnetizable or has magnetic properties, and the outer coating (5) is subdivided into two half-shells whose magnetic orientations are mutually opposed.

7 Claims, 1 Drawing Sheet

LIGHT WAVEGUIDE AND AN OPTICAL FIBER ISOLATOR

PRIORITY APPLICATIONS

This application claims the benefit of priority under 35 U.S.C. § 119 of German Patent Application No. 19947033.2, filed Sep. 30, 1999, and is a national stage filing under 35 U.S.C. § 371 of PCT Application No. PCT/DE00/03461, filed Oct. 2, 2000.

FIELD OF THE INVENTION

The invention pertains to an optical waveguide and a fiberoptic isolator containing the waveguide.

BACKGROUND OF THE INVENTION

Fiberoptic components and sensors are gaining increasing importance in the transmission and processing of signals in optical communications systems and in many fiberoptic devices/systems. Fiberoptic devices/systems ordinarily contain at least one light-transmitting optical fiber (optical waveguide, glass fiber), a signal-processing component and/or a sensor, as well as a source (laser or laser diode) emitting coherent radiation.

In the transmission of signals over very long paths, such as intercontinental transmission, it is necessary to amplify the signal at regular intervals.

In most Fiberoptic systems it must be assured that optical signals are not back-scattered into the laser light source or the optical amplifier, since this may bring about undesired oscillations. Moreover, the back-scattered light increases the noise level of the system.

To solve this problem, isolators are installed in fiberoptic systems and optical amplifiers. They guarantee that light is transmitted in only one direction, and that propagation in the opposite direction is largely suppressed.

A commonly used optical isolator is the so-called "bulk" isolator. Here, a magnetooptical crystal subjected to an external magnetic field is arranged between two polarizers whose directions of polarization enclose an angle of 45°. Due to the magnetooptical effect (Faraday effect), the plane of polarization of the incident light is rotated by 45°, independently of its initial orientation. The incident linearly polarized light thus passes through the first polarizer rotating the plane of polarization by 45°, so that it can pass through the second polarizer unattenuated. The plane of polarization of the back-scattered light reaching the second polarizer is likewise rotated by 45°, but is thus displaced by 90° with respect to the polarization direction of the first polarizer and cannot pass through it.

The use of a magnetooptical film in place of a magnetooptical crystal is also known.

Along with these "bulk" isolators, so called "all-fiber" insulators are also used (see, for instance, U.S. Pat. No. 5,479,542). Although the magnetooptical effect in the glass fiber is exploited in this type of isolator, an additional device for generating an external nagnetic field is necessary. This has the disadvantage that the optical components are comparatively large and cannot be built into the cable. Additionally, the aforementioned isolators are extremely temperature- and humidity-sensitive. They must therefore be protected from environmental influences and arranged, for example, in a closed container such as a sleeve. For certain network infrastructure such as oceanic cable or aerial cable networks, this is not possible at all or is possible only at great expense.

The problem to be solved by the invention is therefore to create an optical waveguide serving as a polarization rotator and which can be integrated into an optical waveguide system.

Another problem to be solved by the invention is to provide a fiberoptic isolator that avoids the above-mentioned disadvantages.

SUMMARY OF THE INVENTION

According to the invention, problems mentioned above are solved by an optical waveguide according to claim 1 and by an optical isolator according to claim 5. The subordinate claims pertain to additional advantageous aspects of the invention.

The optical waveguide according to the invention contains a core whose material has a sufficiently large Faraday effect, as well as a magnetic or magnetizable outer coating that generates a permanent magnetic field producing the Faraday effect. Such a waveguide can be integrated into ordinary waveguide systems and easily joined to other waveguides (glass fibers, LWL cores, LWL fiber tapes and so on), in particular, by splicing.

In accordance with one aspect of the invention, the outer coating is formed by two half-shells, one half-shell constituting the magnetic south pole and the other the magnetic north pole. The magnetic field generated by the half-shells can be relatively weak, as long as the effective length, that is, the length of the half-shells enclosing the fiber core is selected to be sufficiently large, for instance, 10 m.

It has proven especially advantageous to dope the fiber core, normally consisting of quartz glass, with YIG material, which exhibits a sufficiently large Faraday effect.

Preferably, the optical waveguide according to the invention is used as a single waveguide.

The optical isolator according to the invention is a fiberoptic isolator with at least one polarizer and one polarization rotator with an optical waveguide that has a core having a sufficiently large Faraday effect and an outer coating. According to the invention, the outer coating is configured such that it generates a permanent magnetic field in the core.

According to another advantageous aspect of the invention, the polarizer comprises a polarization-maintaining or a polarization-rotating glass fiber, where the fibers of the polarizer and the polarization rotator are constructed in one piece as spliced, continuous optical glass fibers.

BRIEF DESCRIPTION OF THE DRAWINGS

Additional advantages of the invention can be seen from the description below with the appended drawings, showing in.

DETAILED DESCRIPTION OF THE DRAWINGS

Figure 1:
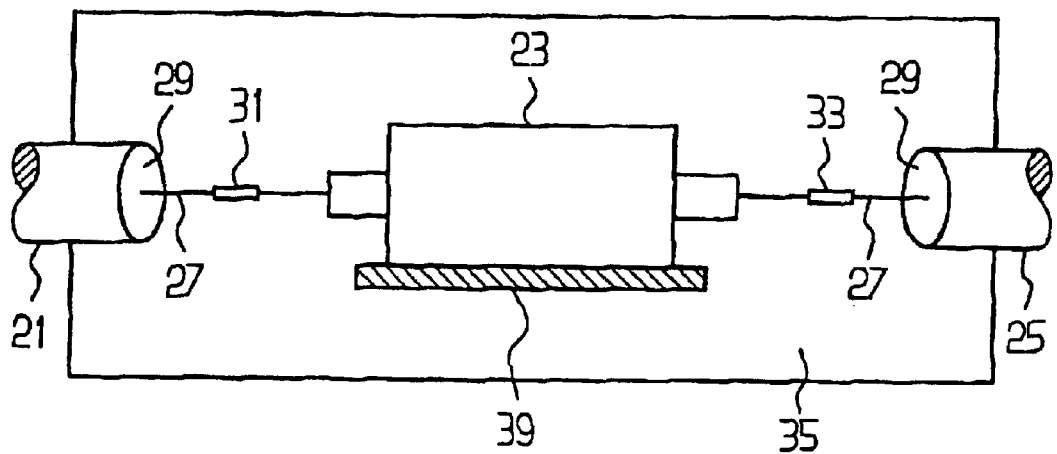
FIG. 1, the schematic structure of a known "bulk" isolator.

For better understanding of the invention, a conventional optical isolator will first be described with reference to FIG. 1. Via a glass fiber cable 21 (ending at 29 as illustrated) containing an optical waveguide 27 (glass fiber, glass fiber core) that continues beyond end 29, a light signal reaches optical isolator 23, and reaches another glass fiber cable 25 at its end 29 via another optical waveguide 27. Glass fibers 21 and 27 each consist of a core (index of refraction $n_K$) and a cladding (refractive index $n_M < n_K$).

The isolator consists of a polarizer and a polarization rotator, incident light being coupled into the polarizer by way of a plug connection or a splice 31. The polarization rotator brings about a rotation of the polarization direction of the incident signal light by 45°. The light rotated in the polarization direction leaves the isolator via an additional plug connection or splice 33.

A housing 35 that contains the plug connections/splices 31/33, the polarizer and the polarization rotator is provided for the protection of the isolator.

The rotation of the direction of polarization by the polarization rotator is achieved by means of the electrooptical effect. For this purpose a magnetic field is applied to a suitable crystal.

The extent of rotation (angle of rotation $\Phi$ of the plane of polarization) is calculated as:

$$\Phi = R \cdot l \cdot H$$

where l designates the length, H the magnetic field strength and R the material- and frequency-dependent Verdet constant.

Accordingly, the device shown in FIG. 1 contains a means 39 generating a permanent magnetic field that is integrated into the isolator 23 seated on a mounting plate 39.

The device shown in FIG. 1 has the disadvantage that it is not integrated into the cable, but rather the housing projects from the cable. This makes it difficult to lay the cable over rather long distances, such as in marine cables and the like.

Figure 2:
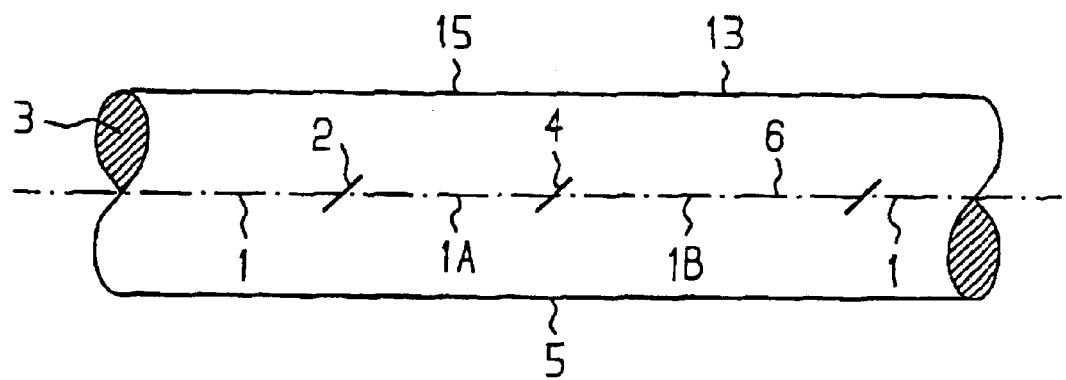
FIG. 2, the essential elements of an optical isolator according to the invention.
Figure 3:
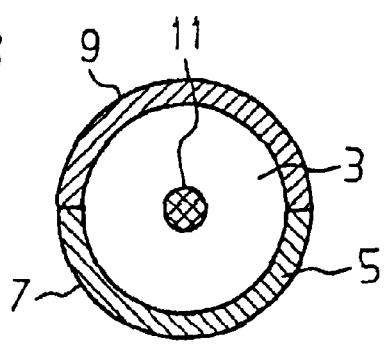
FIG. 3, the optical isolator-according to the invention in cross section.

FIG. 2 shows a sketch of an isolator according to the invention. According to the invention, the isolator is integrated into cable 13 as a fiber-shaped element. Cable 13 has two optical waveguides 1, which are connected by way of the optical fiber isolator, consisting of a polarizer optical waveguide 1A and a polarization-rotating optical waveguide 1B. 2, 4, 6 designate the splice joints between the respective elements. Thus, the polarizer and the polarization rotator are integrated in the form of waveguides into cable 13. A polarizing fiber 1A (if the incident radiation is not polarized) or a polarization-maintaining fiber 1A (if the incident radiation is polarized) is used as the polarizer. A special glass fiber 1B, shown in cross section in FIG. 3, is used as the polarization rotator. The length of the glass fiber 1A serving as polarizer can be relatively short (less than 5 m). The length of the polarization-rotating glass fiber 1B, on the other hand, depends on the wavelength of the radiation being used, the Verdet constant R of the core material, and the magnetic field strength H. By virtue of the above-described mode of construction the attenuations produced by the optical isolator are relatively low.

FIG. 3 shows the schematic structure of the polarization-rotating waveguide 1B. It consists of a glass fiber core 11 with a positive Verdet constant R. The glass fiber core 11 is surrounded by a cladding 3. A coating 5 that consists of a magnetic or magnetizable material is applied to the cladding 3. The coating 5 generates the magnetic field at the site of the glass fiber core 11. To this end, the magnetic coating is preferably divided into two half-shells forming the magnetic north and south poles.

Corresponding to a preferred embodiment, the glass fiber core 11 is doped with a material having a sufficiently large Verdet constant R. An example of this in the range of a wavelength $\lambda > 1500$ nm is the material YIG (yttrium-iron garnet). This has an angle of rotation of 175°/cm at $10^4$ G (1 T).

Because of the relatively large interaction lengths of roughly 10 m, it suffices that the coating 5 generates a relatively weak magnetic field. Under the preconditions above and an interaction length l=10 m, a magnetic field of 2.6 G(260 $\mu$T) is sufficient.

$H = \Phi \div (R^* \cdot l)$, wherein $* = 10^4$ G $H = 45° \div [((175°/cm^*) \cdot 10^4 \, G) \cdot 10 \, m)]$

H=2.6 G

The magnetic or magnetizable materials/thin films known from data and sound recording technology come into particular consideration as coating 5.

In addition to the small diameter of tho polarization rotator thus constructed, which permits integration into the cable, the possibility of easy joining by fusion splicing exists, which can reduce reflection at the joint site. In combination with a polarizing or polarization-preserving glass fiber as polarizer, it is thus possible to construct an optical isolator that is completely integrated into the cable.

Although the invention was described in the foregoing with reference to a special embodiment, the invention is not limited thereto. Instead of doping with YIG, for instance, doping can be accomplished with other materials with a suitable Verdet constant. Such materials as those used for the magnetic coating of data media suggest themselves as materials for the magnetic coating. It is possible to effect the magnetization of the coating only after application of the coating to the cladding 3 of glass fiber core 11.

What is claimed is:

1. An optical waveguide, said optical waveguide comprising a fiber core, a fiber cladding and an outer coating, wherein the outer coating consists of a magnetizable material or a material having magnetic properties, and wherein the outer coating generates a sufficiently large magnetic field, creating a Faraday effect in the fiber core along a length of the fiber, that causes a substantial polarization effect, and wherein the outer coating is subdivided into two half-shells whose magnetic orientations are mutually opposed.

2. The optical waveguide according to claim 1, wherein the core is doped with YIG material.

3. The optical waveguide according to claim 1, wherein the optical waveguide is a single waveguide.

4. An optical isolator with a polarizer and a polarization rotor (13), having an associated light waveguide fiber having a fiber core showing a Faraday effect, a fiber cladding, and an outer fiber coating, wherein the outer fiber coating generates a permanent magnetic field in the fiber core, the magnetic field being sufficiently large to create the Faraday effect in the fiber core along a length of the fiber, causing a substantial polarization effect, and wherein the outer coating of the optical waveguide fiber is subdivided into two half-shells whose magnetic orientations are mutually opposed.

5. The optical isolator according to claim 4, wherein the polarizer comprises a polarization-preserving or polarization-rotating glass fiber, wherein the fibers of the polarizer and the polarization rotator are constructed in one piece as a continuous, spliced optical glass fibers.

6. The optical isolator according to claim 4, wherein the core is doped with YIG material.

7. The optical isolator according to claim 4, wherein the optical waveguide fiber is a single waveguide.

* * * * *